United States Patent
Höglund et al.

(10) Patent No.: US 12,363,743 B2
(45) Date of Patent: Jul. 15, 2025

(54) ACTIVATION AND DE-ACTIVATION OF SEMI-PERSISTENT SCHEDULING

(71) Applicant: Telefonaktiebolaget LM Ericsson (publ), Stockholm (SE)

(72) Inventors: Andreas Höglund, Solna (SE); Johan Bergman, Stockholm (SE); Ritesh Shreevastav, Upplands Väsby (SE); Yutao Sui, Solna (SE); Tuomas Tirronen, Helsinki (FI); Stefan Wänstedt, Luleå (SE); Emre Yavuz, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 47 days.

(21) Appl. No.: 16/648,315

(22) PCT Filed: Sep. 18, 2018

(86) PCT No.: PCT/EP2018/075240
§ 371 (c)(1),
(2) Date: Mar. 18, 2020

(87) PCT Pub. No.: WO2019/053291
PCT Pub. Date: Mar. 21, 2019

(65) Prior Publication Data
US 2021/0100001 A1    Apr. 1, 2021

(30) Foreign Application Priority Data

Sep. 18, 2017   (WO) ............... PCT/EP2017/073524

(51) Int. Cl.
*H04W 72/53*   (2023.01)
*H04L 1/00*    (2006.01)
(Continued)

(52) U.S. Cl.
CPC .......... *H04W 72/53* (2023.01); *H04L 1/0038* (2013.01); *H04W 8/08* (2013.01); *H04W 24/08* (2013.01); *H04W 72/23* (2023.01); *H04W 76/28* (2018.02)

(58) Field of Classification Search
CPC ................................................ H04W 72/0493
See application file for complete search history.

(56) References Cited

U.S. PATENT DOCUMENTS

2015/0003311 A1* 1/2015 Feuersaenger ........ H04W 72/23
370/311
2016/0278053 A1 9/2016 Lee et al.
(Continued)

FOREIGN PATENT DOCUMENTS

WO    2013127453 A1    9/2013

OTHER PUBLICATIONS

Huawei et al., "Revised WID on Further NB-IoT Enhancements", 3GPP TSG RAN Meeting #76, West Palm Beach, USA, Jun. 5, 2017, pp. 1-5, RP-171428, 3GPP.
(Continued)

*Primary Examiner* — Abdeltif Ajid
(74) *Attorney, Agent, or Firm* — Weisberg I.P. Law, P.A.

(57) ABSTRACT

A method performed by a wireless device, UE, for configuring a semi-persistent scheduling, SPS is described. In accordance with the method, the UE may be configured to monitor a first search space of a physical downlink control channel for downlink control information, DCI, dedicated to the UE. The method may include receiving from the communication network SPS configuration data to configure a second search space to be monitored by the UE for DCI to activate or de-activate the SPS, the second search space being smaller than the first search space, and monitoring the second search space to detect the DCI to activate or de-
(Continued)

110 — receiving from the communications network SPS configuration data to configure a search space be monitored by the UE for SPS operation 120 — monitoring the search space for detecting the DCI information to activate or de-activate the SPS activate the SPS. A corresponding method may be performed by a network node.

12 Claims, 5 Drawing Sheets

(51) Int. Cl.
   *H04W 8/08* (2009.01)
   *H04W 24/08* (2009.01)
   *H04W 72/23* (2023.01)
   *H04W 76/28* (2018.01)

(56) References Cited

U.S. PATENT DOCUMENTS

| | | | |
|---|---|---|---|
| 2017/0331577 A1* | 11/2017 | Parkvall | H04W 4/00 |
| 2017/0331670 A1* | 11/2017 | Parkvall | H04L 41/0816 |
| 2018/0270812 A1* | 9/2018 | Lee | H04W 72/0446 |
| 2019/0116608 A1* | 4/2019 | Kim | H04W 72/1263 |
| 2020/0045706 A1* | 2/2020 | Shin | H04W 72/23 |
| 2020/0178291 A1* | 6/2020 | Sha | H04L 1/1812 |

OTHER PUBLICATIONS

Ericsson, "Semi-Persistent Scheduling for NB-IoT", 3GPP TSG-RAN WG1 Meeting #90, Prague, Czech Republic, Aug. 21, 2017, pp. 1-3, R1-1712623, 3GPP.

Intel Corporation, "Semi-Persistent Scheduling for feNB-IoT", 3GPP TSG RAN WG1 Meeting #90, Prague, Czech Republic, Aug. 21, 2017, pp. 1-5, R1-1712503, 3GPP.

"RAN1 Chairman's Notes", 3GPP TSG RAN WG1 Meeting #90, Prague, Czech Republic, Aug. 21, 2017, pp. 1-143, 3GPP.

Huawei et al., "On Support of Semi-Persistent Scheduling", 3GPP TSG RAN WG1 Meeting #89, Hangzhou, China, May 15, 2017, pp. 1-3, R1-1707023, 3GPP.

3rd Generation Partnership Project, "3rd Generation Partnership Project; Technical Specification Group Radio Access Network; Evolved Universal Terrestrial Radio Access (E-UTRA); Physical Layer Procedures (Release 14)", Technical Specification, 3GPP TS 36.213 V14.2.0, Mar. 1, 2017, pp. 1-454, 3GPP.

Huawei et al., "On Support of Semi-Persistent Scheduling", 3GPP TSG RAN WG1 Meeting #90, Prague, Czech Republic, Aug. 21, 2017, pp. 1-2, R1-1712115, 3GPP.

3rd Generation Partnership Project, "3rd Generation Partnership Project; Technical Specification Group Radio Access Network; Evolved Universal Terrestrial Radio Access (E-UTRA); Medium Access Control (MAC) Protocol Specification (Release 14)", Technical Specification, 3GPP TS 36.321 V14.2.0, Mar. 1, 2017, pp. 1-106, 3GPP.

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 14)", Technical Specification, 3GPP TS 36.331 V14.2.0, Mar. 1, 2017, pp. 1-721, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14)", Technical Specification, 3GPP TS 36.300 V14.2.0, Mar. 1, 2017, pp. 1-330, 3GPP.

EPO Communication dated Nov. 17, 2021 for Patent Application No. 17773978.4, consisting of 5-pages.

* cited by examiner

ACTIVATION AND DE-ACTIVATION OF SEMI-PERSISTENT SCHEDULING

TECHNICAL FIELD

The present disclosure generally relates to scheduling of resources in a wireless communication system, and specifically relates to a handling of semi-persistent scheduling in 3GPP.

BACKGROUND

In recent times, technologies have been specified within the frame of 3GPP to cover Machine-to-Machine (M2M) and Internet of Things (IoT) related communication. Recent work for 3GPP Release 13 and 14 includes enhancements to support Machine-Type Communications (MTC) providing new UE categories (Cat-M1, Cat-M2), supporting reduced bandwidth of 6 physical resource blocks (PRBs) (up to 24 PRBs for Cat-M2), and Narrowband Internet of Things (NB-IoT) UEs providing a new radio interface (and respective UE categories: Cat-NB1 and Cat-NB2).

The Long Term Evolution, LTE, enhancements introduced in 3GPP Release 13,14 and 15 for MTC will be referred to as enhanced Machine-Type Communications (eMTC), including (not limiting) support for bandwidth limited UEs, Cat-M1, and support for coverage enhancements. This is to separate discussion from NB-IoT (notation here used for any Release), although the supported features are similar on a general level.

There are multiple differences between "legacy" LTE (i.e. LTE specifications up to Release 12) and the procedures and channels defined for eMTC and for NB-IoT. Some important differences include an introduction of new physical channels, such as the physical downlink control channels, called "MTC physical downlink control channel" (MPDCCH) in eMTC and "Narrowband Physical Downlink Shared Channel" (NPDCCH) in NB-IoT, and a "new physical random-access channel", NPRACH, for NB-IoT.

Some aspects of NB-IoT to support (e.g. low-end) IoT devices and services, while reusing LTE infrastructure may include: a modification of the physical layer for coverage enhancements and power consumption reduction by: reduced system BW (e.g. 180 kHz), reduction of transmission modes and number of antenna ports, reduced TB size, improved DRX cycles for both connected and idle modes, single HARQ process for both DL and UL, etc.

With regards to system aspects, modifications with respect to LTE may include: a reduced connected mobility support or an absence of any connected mobility support (assuming that majority of the NB-IoT applications will be used by stationary UEs) and system optimizations for efficient data transmission (that may also be called Control Plane (CP)/User Plane (UP) cellular IoT (CIoT) Optimization). The CP solution may be based on the concept of user plane (UP) data transmission over Non-Access Stratum (NAS) signaling, without establishment of the Data Radio Bearer (DRBs) and is a preferred solution for NB-IoT UEs. The UP solution on the other end may be built upon the idea of holding the UE context at the eNB when the UE moves to RRC IDLE state, thus decreasing the signaling overhead when the UE is switching between IDLE and CONNECTED mode e.g. with a use of newly introduced RRC Resume/Suspend procedures.

Semi-persistent Scheduling (SPS) is a method used to schedule data sent in short bursts at regular intervals. In contrast to dynamic scheduling, where the resource allocation is fully dynamic, in SPS the eNB can preconfigure certain resources in the DL and/or UL for the UE to use. In the legacy LTE system and eMTC, the SPS can be configured in either or both UL and DL through RRC (SPS-config containing SPS C-RNTI and periodicity, etc.), but the activate/re-activate/release (deactivate) SPS in done through the downlink control information (DCI) according to 3GPP TS 36.213.

In LTE, DCI is carried by the Physical Downlink Shared Channel" (PDCCH). The DCI includes resource assignments for a UE or for a group of UEs. The radio access network (eNB) can transmit one or a plurality of DCIs/PDCCHs in a subframe. The eNB may need to send a lot of parameters to the UE for its operation but there may be some information that is not required for a particular UE.

There can be many places in a PDCCH region where a specific PDCCH is located. All the possible locations for PDCCH form the so-called search space to be monitored by the UE, and each of the possible locations may be called (PDCCH) candidate. The eNB may send control information which is common for all (or a group of) UE's within a so-called common search space, and it may use a so-called UE specific search space to send control information for a particular UE only.

Using the legacy LTE system as an example, when configured with SPS, the UE monitors the DCIs that are scrambled by SPS-C-RNTI in the PDCCH. The DCI formats 1/1A/2/2A/2B/2C are used to activate SPS in DL. DCI format 0 is used to activate SPS in UL. DCI format 1A is used to release SPS in DL. The UE monitors the PDCCH in every subframe in connected mode before entering Discontinuous Reception (DRX), and therefore the use of DCI ensures the scheduling flexibility at the eNB, as the SPS can be activate/reactivate/release (deactivate) as fast as in a defined time (e.g. 1 ms).

The SPS may also be implicitly released e.g. using a signal called "implicitReleaseAfter" that is after N padding MAC PDUs, and timer based that the UE should clear any configured downlink assignments and uplink grants when a certain time (e.g. being controlled by a so-called timeAlignmentTimer) expires, or during MAC reset, or when the UE has transmitted the scheduling request for a maximum number of times (dsr-TransMax).

Moreover, the SPS may also be reconfigured through RRC in that when SPS for uplink or downlink is disabled by RRC, the corresponding configured grant or configured assignment shall be discarded.

Currently, SPS is not supported in NB-IoT. As discussed in 3GPP document R1-1712623 (Semi-persistent scheduling for NB-IoT), there are several use cases in which NB-IoT may benefit from SPS. Due to the coverage enhancement features of NB-IoT, the maximum number of repetitions that can be used is 2048. Therefore, as discussed in 3GPP document R1-1712115 (On support of semi-persistent scheduling), in NB-IoT, the use of SPS may only reduce the UE power consumption, if the monitoring efforts of NPDCCH is reduced.

For reducing the NPDCCH monitoring, 3GPP document R1-1712503 (Semi-persistent scheduling for feNB-IoT) proposes to transmit NPDCCH for dynamic scheduling only in certain configured occasions/durations. For example, the NPDCCH monitoring instances can be configured periodically with an offset with respect to the start of SPS intervals." However, this solution would limit the scheduling flexibility of NPDCCH used for dynamic scheduling, as it binds the NPDCCH for dynamic scheduling together with the SPS operations.

SUMMARY

It is an object of the present invention to improve a handling of semi-persistent scheduling, especially to provide solutions to activate (comprising re-activate) or release (deactivate) SPS allowing the UE to operate in an energy efficient manner, thereby maintaining a certain level of scheduling flexibility.

This object is achieved by the independent claims. Advantageous embodiments are described in the dependent claims and by the following description.

In an embodiment, a wireless device, UE, communicating with a communications network is being configured to monitor a first search space of a physical downlink control channel for downlink control information, DCI, dedicated to the UE. The UE receives from the communication network SPS configuration data to configure a second search space be monitored by the UE for detecting DCI concerning an activation or de-activation of the SPS, wherein the second search space is smaller than the first search space. The UE monitors the second search space for detecting the DCI to activate or de-activate the SPS operation.

In an embodiment, a network node (RAN entity or MME) configures the UE with semi-persistent scheduling, SPS, by sending to the UE SPS configuration data to configure a second search space be monitored by the UE for DCI information to activate or deactivate SPS; wherein the second search space is smaller than a first search space of a physical downlink control channel for downlink control information, DCI, dedicated to the UE.

An embodiment concerns the wireless device, UE, for configuring a semi-persistent scheduling, SPS, the UE being adapted to perform the steps of receiving from the communication network SPS configuration data to configure a second search space be monitored by the UE for DCI to activate or de-activate the SPS, wherein the second search space is smaller than a first search space to monitor DCI dedicated to the UE, and monitoring the second search space for detecting the DCI to activate or de-activate the SPS operation.

An embodiment concerns the network node (RAN entity or MME) for configuring the UE with a semi-persistent scheduling of a UE, the network node being adapted to sending to the UE SPS configuration data to configure a second search space be monitored by the UE for DCI information to activate or deactivate SPS; wherein the second search space is smaller than a first search space of a physical downlink control channel for DCI dedicated to the UE.

BRIEF DESCRIPTION

Figure 6:
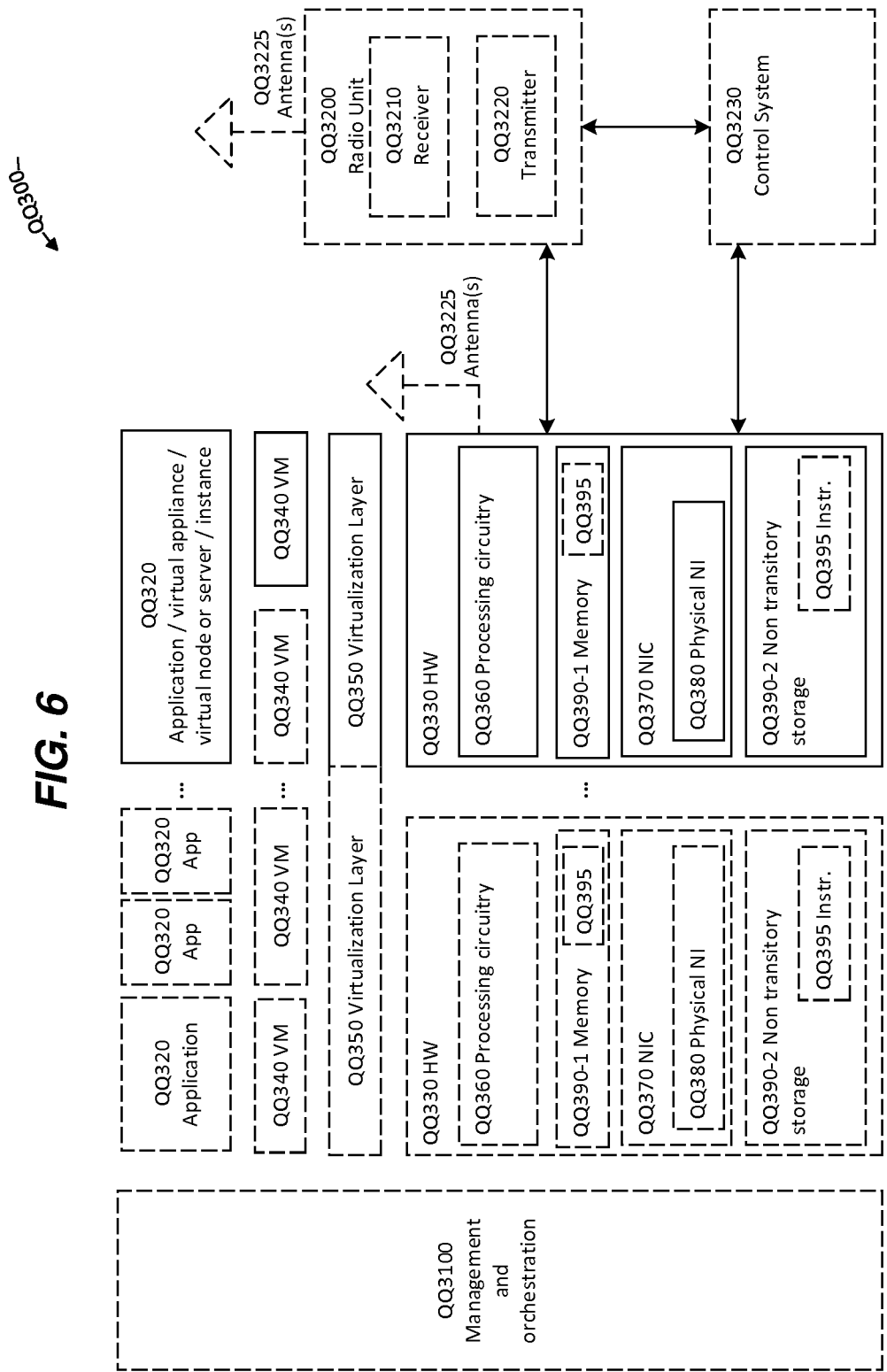

FIG. 6 schematically illustrates an exemplary virtualization environment in accordance with some embodiments.

DETAILED DESCRIPTION OF THE FIGURES

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In the following, the term Radio Access Network (RAN) entity is being used for any function or node that controls one or more (radio access network) cells and can configure the UE with certain configurations that the UE supports. Examples of the RAN entity in the current network can be the eNB according to 3GPP LTE specifications, or radio network controller RNC. The term Mobility Management Entity (MME) will be used for any node or function (of the core network) performing mobility management with respect to the UE, e.g. the Mobility Management Entity according to 3GPP LTE specifications.

One of the properties of the NB-IoT service is that the type of applications a UE is used for may be known in advance, such as electricity meters, sensors, goods tracking. It may be likely that a NB UE (NB IoT) only runs one service or application. However, even if the UE knows that characteristics of the service, the eNB doesn't know until it has been notified by the UE. This is different from the existing LTE system, where the UE can run different services from time to time. The eNB can be notified of the services when the UE requests the setup of different types of radio bearers.

It is an insight that the use of SPS may significantly reduce the UE power consumption, if the efforts of monitoring the downlink physical control channel PDCCH/NPDCCH is reduced. This is especially beneficial, if the UE is a NB IoT having only limited power resources. In one of the embodiment, the UE is configured to monitor a predefined (small) set of (N)PDCCH candidates in a NPDCCH search space for the DCI used to activate or release (deactivate) SPS operations.

Figure 1:
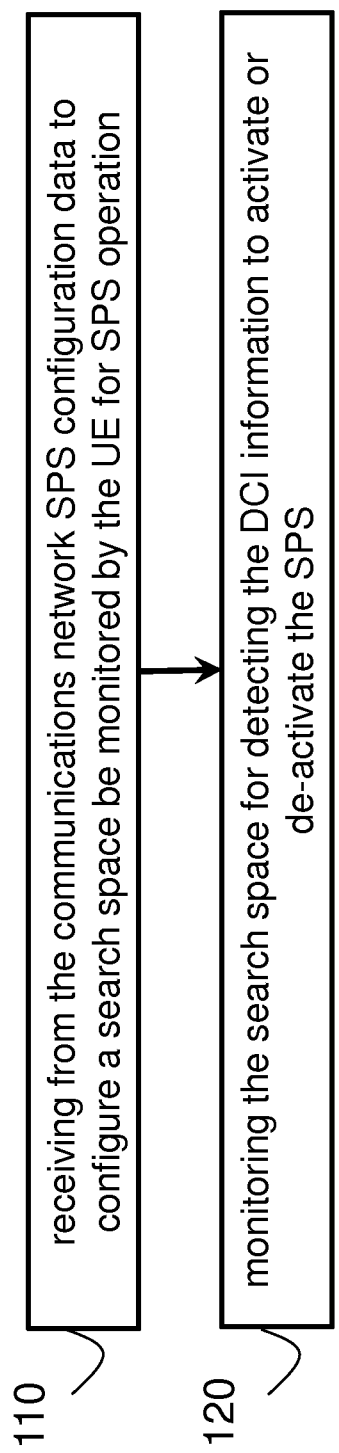
FIG. 1 is a flow diagram illustrating exemplary method steps of a UE for an SPS configuration of the UE in accordance with certain embodiments.

FIG. 1 thereto shows exemplary steps of method performed by the UE for configuring SPS.

In a first step 110, the UE receives from the communication network SPS configuration data to configure a second search space be monitored by the UE for DCI to activate or de-activate the SPS, wherein the second search space is smaller than a first search space of a physical downlink control channel for DCI dedicated to the UE.

In a second step 120, the UE monitors the second search space for detecting the DCI to activate or de-activate the SPS operation.

Figure 2:
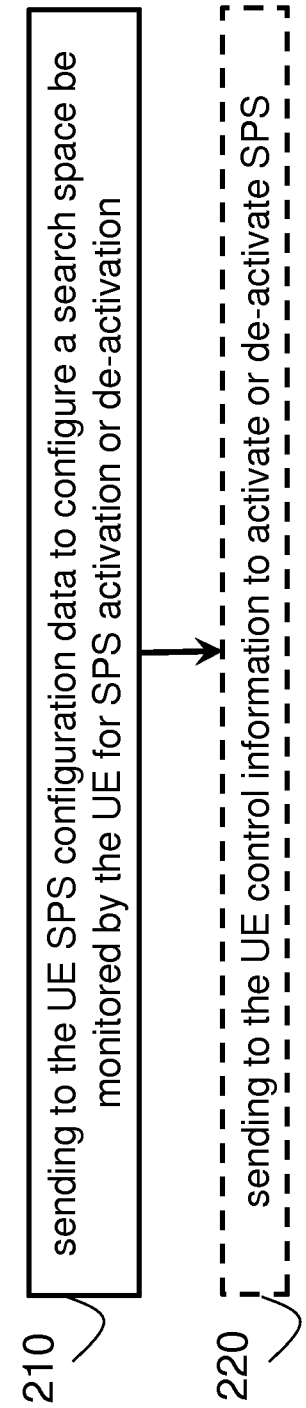
FIG. 2 is a flow diagram illustrating exemplary method steps of a network node for an SPS configuration of the UE in accordance with certain embodiments.
Figure 3:
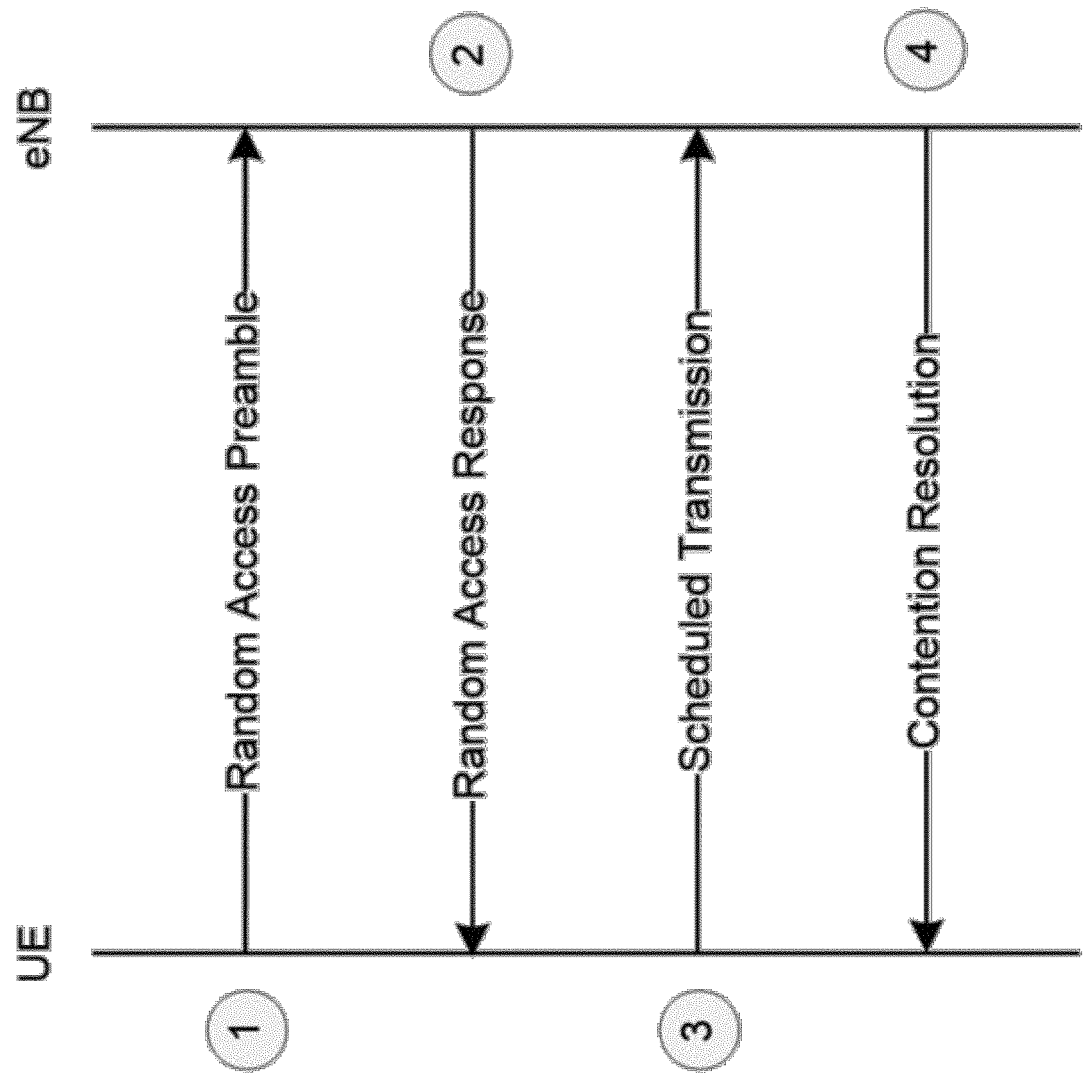
FIG. 3 is a flow chart illustrating a random-access procedure performed in a wireless network according to the prior art.

FIG. 2 thereto shows exemplary steps of method performed by the communications network node for configuring SPS.

In a third step 210, the network node sends to the UE SPS configuration data to configure a second search space be monitored by the UE for DCI information to activate or deactivate SPS, wherein the second search space is smaller than a first search space of a physical downlink control channel for DCI dedicated to the UE. This step may be performed by a RAN entity (e.g. an LTE eNB) or by a mobility management entity (e.g. an LTE MME).

The RAN entity, in a forth step 220 may send to the UE SPS control information to activate or de-activate SPS by inserting the SPS control information into the second search space.

In one of the embodiments, the RAN entity or the MME can indicate which subset of the (N)PDCCH candidates in a (N)PDCCH search space a UE needs to monitor for the control information to activate (that may include to re-activate) or de-activate (release) of SPS operations.

In one of the embodiments, the RAN entity or the MME may further indicate which (N)PDCCH search space a UE needs to monitor for the DCI used for activate/re-activate/release (deactivate) of SPS. That is the UE does not need to monitor all its configured (N)PDCCH search spaces for the DCI used for activate/re-activate/release (deactivate) of SPS. In other words, according to embodiments, the (N)PDCCH search space for detecting the activation/deactivation is smaller than (or of reduced size compared to) the regular (common or UE specific) search space for DCI, or of reduced size compared to the regular search space for DCI.

That is, the UE may reduce the monitoring efforts for detecting the SPS control information. Relaxing the monitoring requirement with respect to SPS activation and deactivation control allows to reduce the power consumption in the UE.

In one of the embodiments, the RAN entity or the MME may configure a search space that is dedicated for the purpose for to activate or deactivate (activate/re-activate/release (deactivate)) SPS, where the search space is monitored less frequent in time comparing to the regular (common or UE specific) search space.

One example is that the RAN entity or the MME can indicate that a UE just needs to monitor a reduced set of DCI search space occasions to detect a command to activate/re-activate/release (deactivate) SPS. The RAN entity or MME may indicate an integer number m such that the (second or modified) search space to be monitored for SPS operations is every n-th DCI search space occasion to be monitored for DCI (associated to the common or UE specific search space), with n being an integer equal or greater than 1.

Compared to "legacy" operation where the UE must decode PDCCH with 'C-RNTI' and 'SPS C-RNTI' in every PDCCH occasion, according to embodiments the UE needs to less frequently monitor the search space (NPDCCH scrambled with the SPS C-RNTI) to detect a command to activate or deactivate SPS.

Thus, at a given time, a peak load for the blind decoding for SPS activation/deactivation may be similar to the blind decoding for DCI. But on average over time, the number of candidates that need to blindly decode is less. This may allow to obtain significant UE power consumption gains.

The search space may be understood as the plurality of possible candidates for DCI. Thus, a search space of reduced size may mean that it comprises a fraction of the regular (N)PDCCH search space; the number of candidates that needs to be blindly decoded for SPS activation/deactivation is less than the total number of candidates that must be blindly decoded for DCI.

Furthermore, (N)PDCCH candidates in this "reduced" or "new" search space can be different from those of the current common or UE specific search space.

In an embodiment, the search space may contain one candidate, with a given maximum number of repetitions. That is the UE may attempt to do only one blind decoding in this search space to identify whether there is a DCI for the activate/re-activate/release (deactivate) of SPS.

In one the embodiments, the RAN entity or the MME may configure the minimum time interval of that the UE should check the (N)PDCCH search space to see whether there is a DCI for the activate/re-activate/release (deactivate) of SPS. That is the UE does not need to check all the (N)PDCCH search spaces. After checking one (N)PDCCH search space, the UE only needs to check the (N)PDCCH search space again after the configured the minimum time.

In one of the embodiments, SPS is activated by default when SPS is configured. That is if, e.g., if the RAN entity or the MME configures the UE to use SPS, the SPS is by default activated from start (differently to legacy where the SPS configuration is later activated by DCI). In embodiments, the SPS configurations can be (temporarily or permanently) suspended or terminated (de-configured) by signaling from the RAN entity or the MME. The signaling can be either from RRC, or done via DCI.

In one of the embodiments, the RAN entity or MME can configure the UE with SPS parameters that have a long validity time, e.g., in terms of hours, days, or even never expire. The SPS parameters are stored in the UE, and the RAN entity or the MME and can activate/re-activate the SPS by signaling. This may be beneficial for uses cases such as larger file transmission, using SPS for scheduling request and buffer status report (BSR), as well as (semi-) stationary UEs with predictable traffic patterns. The signaling can be either from RRC or via DCI.

In one of the embodiments, for suspending or resuming SPS (e.g. in RRC suspend and resume case (Cellular IoT (CIoT) UP Optimization)), the RAN entity or the MME indicates whether previously configured SPS parameters are still valid, and at the same occasion e.g. with the same signaling (at the same time) activate/re-activate the SPS during the (RRC) resume procedure. In an embodiment, such indication may be transmitted in RRC Resume message or some in another RRC message.

In one example, the MCS and number of repetitions may be kept valid, whereas the opportunities in time (i.e., where the transmission can happen) is updated according to the traffic.

In an embodiment thereto, the RAN entity or the MME may indicate whether some of previously configured SPS parameter(s) are updated, and at the same time activate/re-activate the SPS during the RRC resume procedure. In an embodiment, such indication may be transmitted in a RRC Resume message or some in another RRC message.

In one of the embodiments, e.g. in Data-over-NAS transmission (CIoT CP Optimization), the MME can indicate whether the previous configured SPS parameters are still valid, and at the same time activate/re-activate the SPS via NAS signaling e.g. during the RRC Connection setup procedure. For this additional signaling and coordination between MME and eNB is required. E.g. the MME could request that the UE should resume its SPS-configuration and the eNB could then accept, modify or reject this configuration.

In one of the embodiments, e.g. in Data-over-NAS transmission (CIoT CP Optimization), the MME can indicate whether some of previous configured SPS parameter(s) are updated, and at the same time activate/re-activate the SPS during via NAS signaling e.g. during the RRC Connection setup procedure. For this additional signaling and coordination between MME and eNB is required. E.g. the MME may request that the UE resumes its SPS-configuration and the eNB may then accept, modify or reject this configuration.

Figure 4:
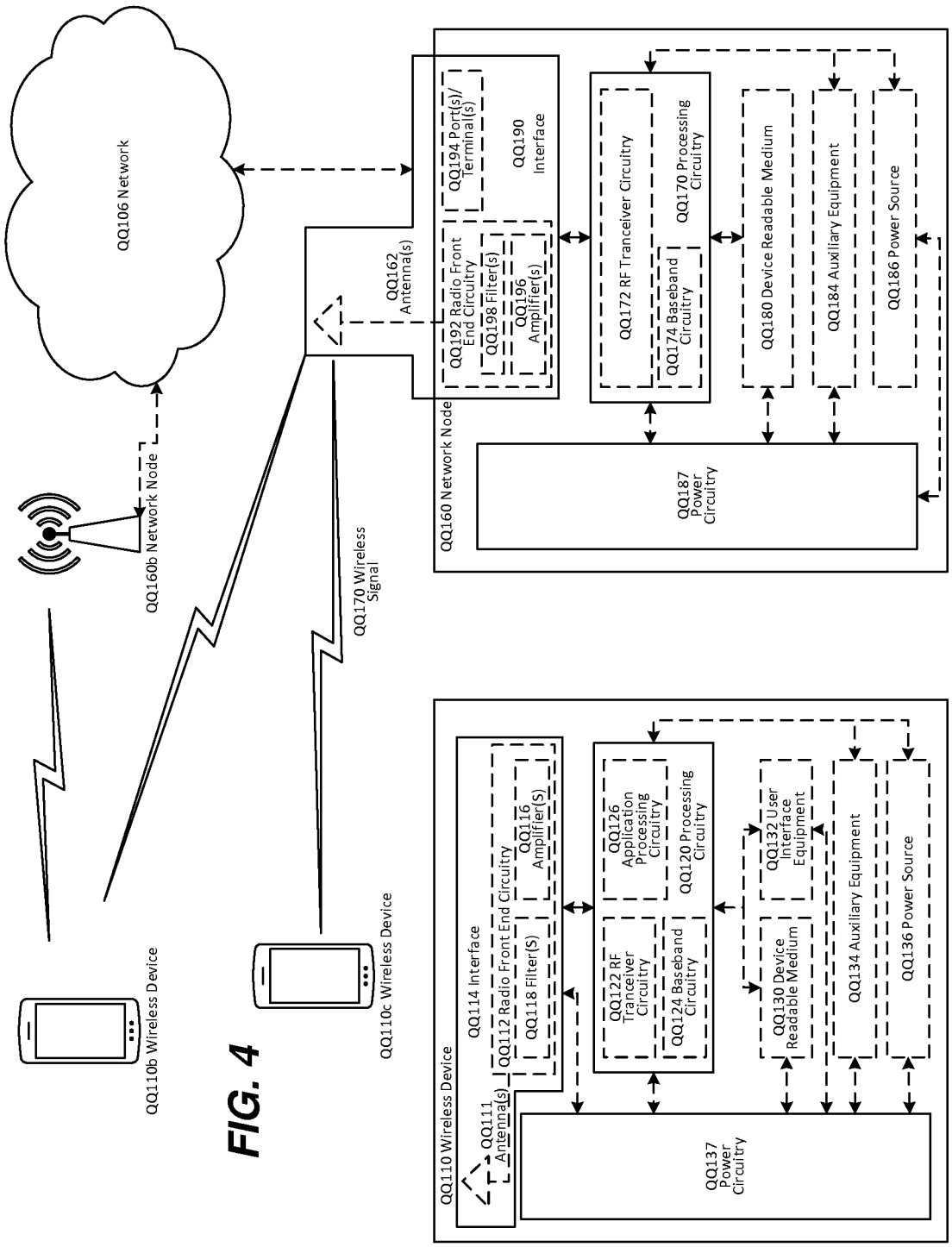
FIG. 4 is a block diagram of an exemplary wireless network in accordance with some embodiments.

Currently specified random access and connection control procedures can be found in the following 3GPP Technical Specifications (TS): 3GPP TS 36.321, "MAC protocol specification", v14.2.0, March 2017 and 3GPP TS 36.331, "RRC protocol specification"; v14.2.0, March 2017. The contention based random access (RA) procedure can be found in 3GPP TS 36.300, "E-UTRA and E-UTRAN; Overall description; Stage 2", v14.2.0, March 2017. This procedure is illustrated in FIG. 4 of the present disclosure. The suite of messages in FIG. 1 are commonly referred to as message 1 (msg1) through message 4 (msg4).

Therein, the UE transmits a first message 1, msg1, comprising a random-access preamble to the eNB, wherein this preamble has been selected out of a given or pre-defined set of preambles. The eNB sends a second message 2, msg2, comprising a random-access response to the UE. Based on msg2, UE sends a third message 3, msg3, as scheduled transmission to the eNB. The fourth message 4, msg4, is sent from the eNB to the UE, in order to resolve a potential contention (of two or more UEs having selected the same random-access preamble).

In one of the embodiments, the activate/re-activate of the SPS in send in the DCI that schedules third message 3, (msg3). This message comprises the RRC_CONNECTION_REQUEST message.

Activation/re-activation of the SPS may be done prior to contention resolution and the RRC setup or RRC resume. This may be beneficial if the RAN entity or the MME knows or have a certain level of certainty that in a certain area most of the UEs are configured with SPS (e.g., a dedicated eNB for collecting data from sensors), which allows to minimize the subsequent signaling.

In one of the embodiments, activation/re-activation of the SPS in send by means of DCI that schedules fourth message 4 (msg4). Msg4 is sent by the RAN entity (eNB) to the UE in response to a successfully received msg3 (contention resolution message). Activation/re-activation of the SPS may be done during contention resolution and the RRC setup or RRC resume. The network knows the identity of the UE after msg3, and if the UE is configured with an SPS setting that is still valid, the eNB can directly activate/re-activate of the SPS without any additional RRC signaling.

In one of the embodiments, a new common channel is defined that is dedicated for activate/re-activate of the SPS of a group of UEs. The UEs are configured with SPS parameters by the RAN entity or the MME. The UEs are also configured to monitor a common channel, the channel comprising indications which group of UEs should activate/re-activate their SPS.

In one of the embodiments, a common channel is provided that is dedicated for deactivate/release of the SPS of a group of UEs. The UEs are configured with SPS parameters by the RAN entity or the MME. The UEs are also configured to monitor a common channel, the channel comprising indications which group of UEs should deactivate/release their SPS In one of the embodiments, the UE is configured with a certain NPDCCH search space to monitor where the activation/re-activation/release (deactivate) information of SPS is signaled by a DCI. The NPDCCH search space can be a newly defined search space, or a modification of the existing search space (e.g., a fraction of the existing search space).

In one of the embodiments, the DCI for activating/deactivating the SPS (scrambled with SPS C-RNTI) is using a different (e.g. longer) DRX cycle than the monitoring of NPDCCH (scrambled with C-RNTI).

In one of the embodiments, the UE is configured with a DRX cycle longer than the periodicity of the SPS resources assigned to the UE. The SPS configuration may in this way contain a SPS DRX cycle which is applied whenever SPS is activated. When SPS is de-activated, the UE may automatically return to the previous/default DRX cycle. In this way, the UE may switch between DRX cycle lengths depending on whether SPS is configured or not.

In one of the embodiments, the deactivation/activation of SPS is carried out in RRC_IDLE mode when the UE is monitoring its paging occasion, either in DCI (The UE maintains it SPS C-RNTI or another RNTI in RRC_IDLE) or in the associated paging message.

In one of the embodiments, the configuration/re-configuration/de-configuration of SPS is carried out in RRC_IDLE mode when the UE is monitoring its paging occasion, e.g. the configuration information is contained in a new paging message scheduled by DCI (scrambled by a maintained SPS C-RNTI or another RNTI in RRC_IDLE).

In one of the embodiments, when SPS is configured, a default DRX setting (one used without SPS) is also configured for the UE by the RAN entity or the MME.

In one of the embodiments, the UE applies its default DRX setting after SPS is deactivated/suspended by the RAN entity or the MME. The RAN entity or the MME can deactivate SPS, e.g., due to traffic load in the network.

Since it takes resources also for the reconfigurations, it is beneficial that the UE can apply its default DRX setting after SPS is deactivated/suspended by the RAN entity or the MME without being reconfigured.

In one of the embodiments, the RAN entity or the MME can preconfigure several sets of different SPS parameters for the UE to use. This can be used for the situation that the UE moves, and the coverage situation changes. When the RAN entity or the MME notices there is change of the UE situation, e.g., coverage, it can apply a new set of SPS parameters. The application of the new SPS parameters can be done via DCI or via other signaling from the RAN entity or the MME to the UE Due to, e.g., the change of radio environment, sometimes the initial transmission may have failed may be wrong). In order to cope with such failures, in the currently operation or defined LTE or NB-IoT systems, HARQ retransmission may is applied.

Such failures may also happen to SPS. Therefore, mechanisms may be provided to enable a retransmission.

In one of the embodiments, a new DCI format is defined to schedule the SPS retransmission. This DCI may be sent to one or a plurality (e.g. to a certain group) of UEs to indicate whether the initial SPS transmission is successful or not. If the initial transmission failed (or was not successful), the UE may perform a retransmission with its configured SPS resources.

In one of the embodiments, a plurality (e.g. a certain group) of UEs may receive the same DCI, and in the DCI comprising an individual indication for each of the UEs whether the previous SPS transmission was successfully received by the network. If the transmission (applies to both initial transmission and retransmission) failed (not successfully received or decoded), a retransmission may be necessary. If the initial transmission failed, the UE may perform a retransmission with its configured SPS resources.

In an embodiment, a dedicated SPS resource just for the SPS retransmissions may be configured by the network (RAN entity or the MME).

In one of the embodiments, a certain signal (that may be sequence based), is used to indicate whether the SPS transmission (applies to both initial transmission and retransmission) failed. If this signal is detected by the UE, the UE can perform a retransmission with its configured SPS resources.

In an embodiment, the length of the new signal may depend on the coverage level of the UE. The signal may be UE specific or may address a (certain or defined) group of UEs.

In an embodiment, the (HARQ) retransmissions are scheduled using ordinary dynamic DCI, but the DCI transmission opportunities are less frequent than in ordinary operation. This may be achieved, e.g., using the methods proposed above. This is motivated by the fact that scheduling of only retransmissions requires fewer DCI transmissions than scheduling of both initial transmissions and retransmissions.

The above-described examples are focusing on NB-IoT, but they are equally applicable to other standards or specifications like LTE MTC (eMTC or Cat-M). In the context of LTE MTC, some naming may differ, e.g. the name of some channels, e.g., the DL control channel in LTE MTC is called MPDCCH.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network QQ106, network nodes QQ160 and QQ160b and WDs QQ110, QQ110b and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) or UE QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, (radio access) network entity or node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 4 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 5:
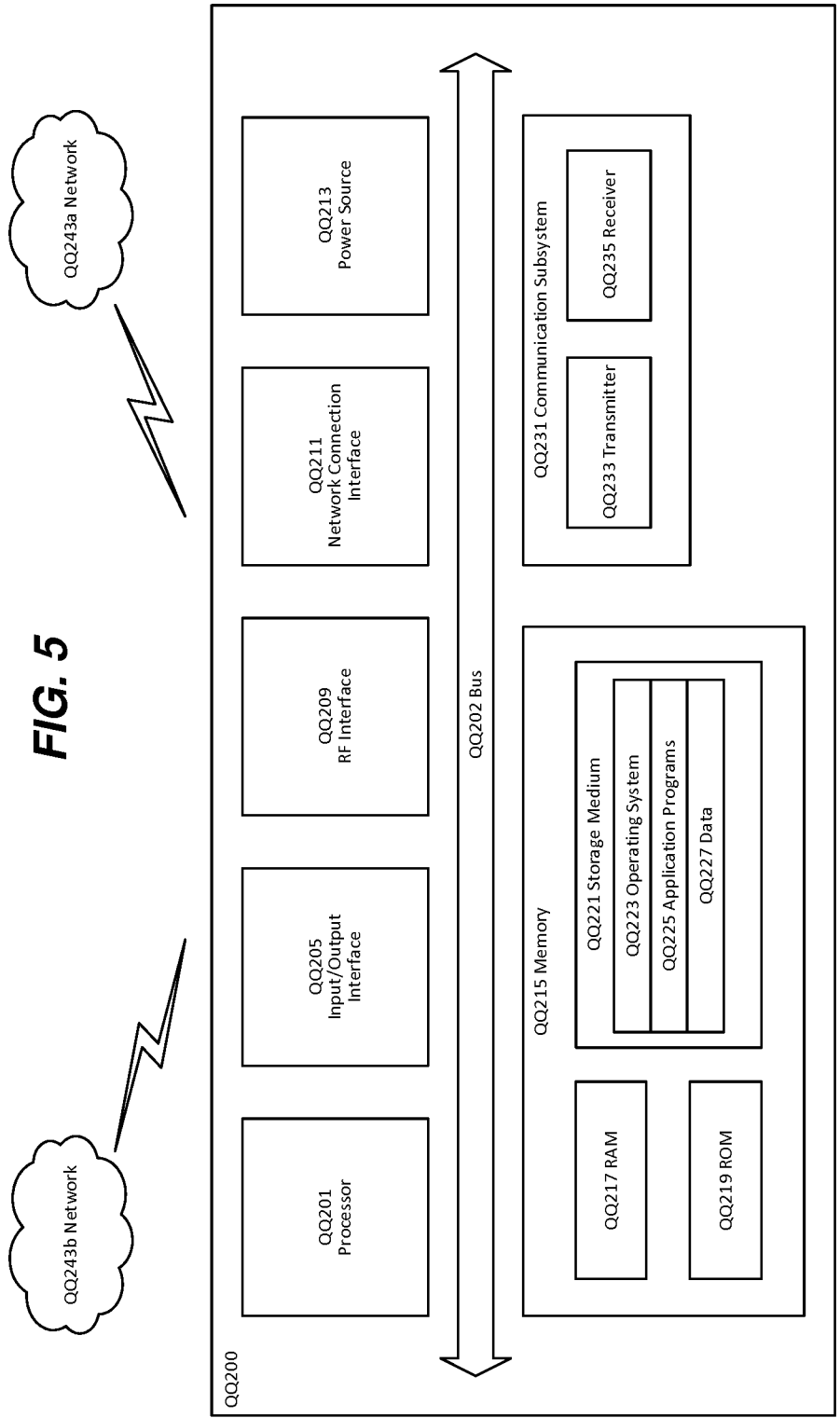
FIG. 5 is a block diagram of an exemplary User Equipment in accordance with some embodiments.

FIG. 5 illustrates one embodiment of a wireless device or UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeably. Accordingly, although FIG. 5 is a UE, the components discussed herein are equally applicable to a WD, and vice-versa.

In FIG. 5, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 5, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits, and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

FIG. 6 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 6, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 6.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the following, further exemplary embodiments are being described:

1. A method performed by a wireless device, UE, for configuring a semi-persistent scheduling, SPS, the method comprising:
   receiving a set of SPS parameters from a node of a communications network node (RAN entity or MME),
   storing the SPS parameters (in a memory of the UE or accessible by the UE), and
   receiving a message from a node of the communications network to activate and/or inactivate SPS operation.
2. The method of the preceding embodiment 1, further comprising:
   after an SPS suspension or SPS de-activation,
   receiving a message comprising an indication whether previously received SPS parameters are still valid, and
   activate and/or re-activate the SPS operation.
3. The method of anyone of the preceding embodiment, further comprising:
   receiving un update information comprising SPS parameters that are no longer valid, and
   activate/re-activate the SPS operation with the previously received valid SPS parameters and the SPS parameters of the update information.
4. The method of any of the preceding embodiments, wherein the message is received by means of RRC signaling or by download control information, DCI, signaling.
5. The method of anyone of the preceding embodiments, wherein the DCI signaling is received in the context of msg3 scheduling (e.g. in the context of RRC connection request scheduling), and wherein activation/re-activation is performed prior to a contention resolution or RRC setup or RRC resuming.
6. The method of anyone of the preceding embodiments, wherein the UE additionally receives a second set of SPS parameters, wherein this set of parameters shall be applied in a defined situation, and applying this set of SPS parameters after detecting that the defined situation occurs, e.g. by receiving an indication from the communication network.
7. The method of any of the preceding embodiments, further comparing receiving an indication of a certain search space of a control channel (NPDCCH, PDCCH) associated to the DCI to be monitored for SPS activation/re-activation/release (deactivate) information.
8. The method of the preceding embodiment, wherein the indication comprises an information of a modification of a previously stored or applied search space (e.g. a certain fraction of the existing search space).
9. A method performed by a network node, the method comprising:
   sending a set of SPS parameters to a UE, and
   sending a message to the UE to activate and/or inactivate SPS operation.
10. The method of the preceding embodiment, further comprising:
    after an SPS suspension or SPS de-activation,
    sending a message comprising an indication whether previously received SPS parameters are still valid.
11. The method of anyone of the preceding embodiments 9-10, further comprising:
    sending un update information comprising SPS parameters that are no longer valid.
12. The method of any of the preceding embodiments 9-11, wherein the message is sent by means of RRC signaling or by download control information, DCI, signaling.
13. The method of anyone of the preceding embodiments 9-12, wherein the DCI signaling is sent in the context of msg3 scheduling (e.g. in the context of RRC connection request scheduling), such that activation/re-activation is performed prior to a contention resolution or RRC setup or RRC resuming.
14. The method of anyone of the preceding embodiments 9-13, wherein a second set of SPS parameters is sent to the UE, wherein this set of parameters shall be applied in a defined situation, and commanding and application of this set of SPS parameters after detecting that the defined situation occurs.
15. The method of any of the preceding embodiments 9-14, further comparing sending an indication of a certain search space of a control channel (NPDCCH, PDCCH) associated to the DCI to be monitored for SPS activation/re-activation/release (deactivate) information.
16. The method of the preceding embodiment, wherein the indication comprises an information of a modification of a previously stored or applied search space (e.g. a certain fraction of the existing search space).
17. A method performed by a wireless device, UE, for configuring a semi-persistent scheduling, SPS, the method comprising:
    receiving a set of SPS parameters from a node of a communications network node (RAN entity or MME),
    storing the SPS parameters (in a memory of the UE or accessible by the UE), and
    receiving a message from a node of the communications network to activate and/or inactivate SPS operation.
18. A wireless device, UE, for configuring a semi-persistent scheduling UE comprising:
    processing circuitry configured to perform any of the steps of any of the embodiments 1-8.
19. The UE of the preceding embodiment, further comprising a power supply circuitry configured to supply power to the UE.
20. A network node for configuring a semi-persistent scheduling of a UE, the network node comprising:

processing circuitry configured to perform any of the steps of any of the embodiments 9-17.
21. The network node of the preceding embodiment, further comprising a power supply circuitry configured to supply power to the network node.

Abbreviations

At least some of the following abbreviations may be used in this disclosure. If there is an inconsistency between abbreviations, preference should be given to how it is used above. If listed multiple times below, the first listing should be preferred over any subsequent listing(s).
Cat-M1 Category M1
Cat-M2 Category M2
DL Downlink
eNB Evolved NodeB
IoT Internet of Things
LTE Long-Term Evolution
NB-IoT Narrowband Internet of Things
M2M Machine-to-Machine
Msg2 Message 2
Msg3 Message 3
Msg4 Message 4
MTC Machine-Typ Communications
PDU Protocol Data Unit
(N)PRACH (Narrowband) Physical Random Access Channel
PRB Physical Resource Block
PSM Power-Saving Mode
RA Random Access
RNTI Radio Network Temporary Identifier
RRC Radio Resource Control (protocol)
SI System Information
SPS Semi Persistent Scheduling
UE User Equipment
UL Uplink
3GPP 3rd Generation Partnership Project
5G 5th Generation
C-RNTI Cell RNTI
CSI Channel State Information
DCCH Dedicated Control Channel
DL Downlink
DRX Discontinuous Reception
DTX Discontinuous Transmission
DTCH Dedicated Traffic Channel
eNB E-UTRAN NodeB
ePDCCH enhanced Physical Downlink Control Channel
HARQ Hybrid Automatic Repeat Request
MME Mobility Management Entity
NPDCCH Narrowband Physical Downlink Control Channel
NR New Radio
P-CCPCH Primary Common Control Physical Channel
PHICH Physical Hybrid-ARQ Indicator Channel
PUCCH Physical Uplink Control Channel
PUSCH Physical Uplink Shared Channel
RACH Random Access Channel
RAN Radio Access Network
RAT Radio Access Technology
RNTI Radio Network Temporary Identifier
RRC Radio Resource Control
RRM Radio Resource Management
RS Reference Signal
UE User Equipment
UL Uplink

The invention claimed is:
1. A method, performed by a wireless device (UE), for configuring a semi-persistent scheduling (SPS), the UE configured to monitor a first search space of a physical downlink control channel for downlink control information (DCI) dedicated to the UE, the method comprising the UE:
receiving, from a communication network, SPS configuration data to configure a second search space monitored by the UE for detecting DCI to activate or deactivate the SPS, the second search space being a fraction of the first search space and the SPS configuration data being indicative of an integer number n such that the second search space is an n-th fraction of the first search space,
the second search space comprising one control information candidate search space such that the UE only has to perform a blind decoding in the control information candidate search space to identify whether there is DCI for activating or the deactivating of an SPS operation,
the SPS configuration data comprising a set of SPS parameters having a long validity time and the SPS parameters being stored in the UE,
the UE being configured with a discontinuous reception (DRX) cycle longer than a periodicity of SPS resources assigned to the UE,
the SPS configuration comprising an SPS DRX cycle to be applied by the UE when SPS is activated; receiving an information of a modification of a previously stored or applied first search space;
when DCI is identified for activation or the deactivation of an SPS operation,
monitoring the second search space to detect the DCI to activate or deactivate SPS operation; and
switching to one of a previous or default DRX cycle upon deactivation of SPS.
2. The method of claim 1, wherein the second search space comprises every n-th occasion of the first search space to be monitored for DCI.
3. The method of claim 1, wherein the first search space is a current common search space or a UE specific search space.
4. The method of claim 1, wherein the physical downlink control channel is a Physical Downlink Control Channel (PDCCH) according to 3GPP LTE specifications, or a Narrowband Physical Downlink Control Channel (NPDCCH) according to 3GPP narrowband LTE specifications.
5. The method of claim 1, wherein the DCI is received from a radio access network node performing wireless communication with the UE.
6. The method of claim 1, wherein the SPS configuration data is received from a radio access network node performing wireless communication with the UE or from a mobility management node for managing the mobility of the UE.
7. A method, performed by a network node, for configuring a wireless device (UE) with semi-persistent scheduling (SPS), the method comprising:
sending, to the UE, SPS configuration data to configure a second search space monitored by the UE for detecting downlink control information (DCI) to activate or deactivate SPS, the SPS configuration data comprising a set of SPS parameters having a long validity time and the SPS parameters being stored in the UE, the UE being configured with a discontinuous reception (DRX) cycle longer than a periodicity of SPS resources assigned to the UE, the SPS configuration comprising an SPS DRX cycle to be applied by the UE when SPS is activated;

configuring the UE to switch to one of a previous or default DRX cycle upon deactivation of SPS;

receiving an information of a modification of a previously stored or applied first search space; and the second search space being a fraction of a first search space of a physical downlink control channel for DCI dedicated to the UE and the SPS configuration data being indicative of an integer number n such that the second search space is an n-th fraction of the first search space, the second search space comprising one control information candidate search space such that the UE only has to perform a blind decoding in the control information candidate search space to identify whether there is DCI for activating or the deactivating of an SPS operation.

8. The method of claim 7, wherein the second search space comprises every n-th occasion of the first search space.

9. The method of claim 7, wherein the physical downlink control channel is a Physical Downlink Control Channel (PDCCH) according to 3GPP LTE specifications, or a Narrowband Physical Downlink Control Channel (NPDCCH) according to 3GPP narrowband LTE specifications.

10. The method of claim 7, further comprising inserting, into the second search space, SPS control information to activate or deactivate SPS.

11. A wireless device (UE) for configuring a semi-persistent scheduling (SPS), the UE comprising: processing circuitry; memory containing instructions executable by the processing circuitry whereby the UE is operative to:

monitor a first search space of a physical downlink control channel for downlink control information (DCI) dedicated to the UE;

receive, from a communication network, SPS configuration data to configure a second search space monitored by the UE for detecting DCI to activate or deactivate the SPS, the second search space being a fraction of the first search space and the SPS configuration data being indicative of an integer number n such that the second search space is an n-th fraction of the first search space, the second search space comprising one control information candidate search space such that the UE only has to perform a blind decoding in the control information candidate search space to identify whether there is DCI for activating or the deactivating of an SPS operation, the SPS configuration data comprising a set of SPS parameters having a long validity time and the SPS parameters being stored in the UE, the UE being configured with a discontinuous reception (DRX) cycle longer than a periodicity of SPS resources assigned to the UE, the SPS configuration comprising an SPS DRX cycle to be applied by the UE when SPS is activated;

receive an information of a modification of a previously stored or applied first search space;

when DCI is identified for activation or the deactivation of an SPS operation, monitor the second search space for detecting the DCI to activate or deactivate an SPS operation; and switch to one of a previous or default DRX cycle upon deactivation of SPS.

12. A network node for configuring a wireless device (UE) with a semi-persistent scheduling (SPS), the network node comprising:

processing circuitry;

memory containing instructions executable by the processing circuitry whereby the network node is operative to:

send, to the UE, SPS configuration data to configure a second search space monitored by the UE for detecting downlink control information (DCI) to activate or deactivate SPS, the SPS configuration data comprising a set of SPS parameters having a long validity time and the SPS parameters being stored in the UE, the UE being configured with a discontinuous reception (DRX) cycle longer than a periodicity of SPS resources assigned to the UE, the SPS configuration comprising an SPS DRX cycle to be applied by the UE when SPS is activated;

configure the UE to switch to one of a previous or default DRX cycle upon deactivation of SPS;

receive an information of a modification of a previously stored or applied first search space; and the second search space being a fraction of a first search space of a physical downlink control channel for DCI dedicated to the UE and the SPS configuration data being indicative of an integer number n such that the second search space is an n-th fraction of the first search space, the second search space comprising one control information candidate search space such that the UE only has to perform a blind decoding in the control information candidate search space to identify whether there is DCI for activating or the deactivating of an SPS operation.

* * * * *